(12) United States Patent
Shanmuganathan et al.

(10) Patent No.: US 12,013,822 B1
(45) Date of Patent: Jun. 18, 2024

(54) DISCOVERY OF DATA SETS

(71) Applicant: Bedrock Labs, Inc., Menlo Park, CA (US)

(72) Inventors: Ganesha Shanmuganathan, San Jose, CA (US); Pranava Adduri, Seattle, WA (US); Devesh Yamparala, San Jose, CA (US)

(73) Assignee: Bedrock Labs, Inc., Menlo Park, CA (US)

( * ) Notice: Subject to any disclaimer, the term of this patent is extended or adjusted under 35 U.S.C. 154(b) by 0 days.

(21) Appl. No.: 18/061,204

(22) Filed: Dec. 2, 2022

(51) Int. Cl.
*G06F 16/185* (2019.01)

(52) U.S. Cl.
CPC .................................. *G06F 16/185* (2019.01)

(58) Field of Classification Search
CPC .. G06F 21/6218; G06F 16/285; G06F 16/951; G06F 16/2246; G06F 16/93
See application file for complete search history.

(56) References Cited

U.S. PATENT DOCUMENTS

| 8,078,653 B1* | 12/2011 | Bisson | G06F 16/164 707/829 |
| 2022/0083576 A1* | 3/2022 | Sakata | G06F 16/3323 |

* cited by examiner

*Primary Examiner* — Hau H Hoang
(74) *Attorney, Agent, or Firm* — Van Pelt, Yi & James LLP

(57) ABSTRACT

Data set discovery is disclosed, including: identifying first file metadata elements for a first file associated with a node in a hierarchy of data; identifying second file metadata elements for a second file associated with the node; identifying common file metadata elements among the first file metadata elements and the second file metadata elements; and determining that the common file metadata elements represent a data set comprising at least the first file and the second file.

20 Claims, 13 Drawing Sheets

900

| Node | Hash(es) |
|---|---|
| N1 | h1 |
| L1 | h1 |
| L2 | h1 |
| L3 | h1 |
| N2 | h1 |
| L4 | h1 |
| L5 | h1 |
| N3 | h2, h3, h4 |
| L6 | h2 |
| L7 | h2 |
| N4 | h3 |
| L8 | h3 |
| L9 | h3 |
| L10 | h4 |
| R | h1, h2, h3, h4 |

| Hashes | Fields |
|---|---|
| h1 | A, B, C, [D], [E], [G], [H], [I], [J] |
| h2 | A, D, E, F, [G], [H], [I] |
| h3 | M, N, [O], [P], [Q] |
| h4 | R, S, T, [U] |
| ... | ... |

FIG. 10

DISCOVERY OF DATA SETS

BACKGROUND OF THE INVENTION

Large volumes of data can accrue in a data storage over time. Evaluating each and every file within the data storage can be an intractable or cost prohibitive task. As such, it would be desirable to efficiently review the data within the data storage to determine data sets within that share similarities so that the data can be processed on the basis of the data sets to which they belong.

BRIEF DESCRIPTION OF THE DRAWINGS

Various embodiments of the invention are disclosed in the following detailed description and the accompanying drawings.

FIG. 9 is a diagram showing an example of a central node mapping table that stores mappings between nodes and their corresponding data set identifier(s).

FIG. 10 is a diagram showing an example of a central identifier table.

DETAILED DESCRIPTION

Figure 1:
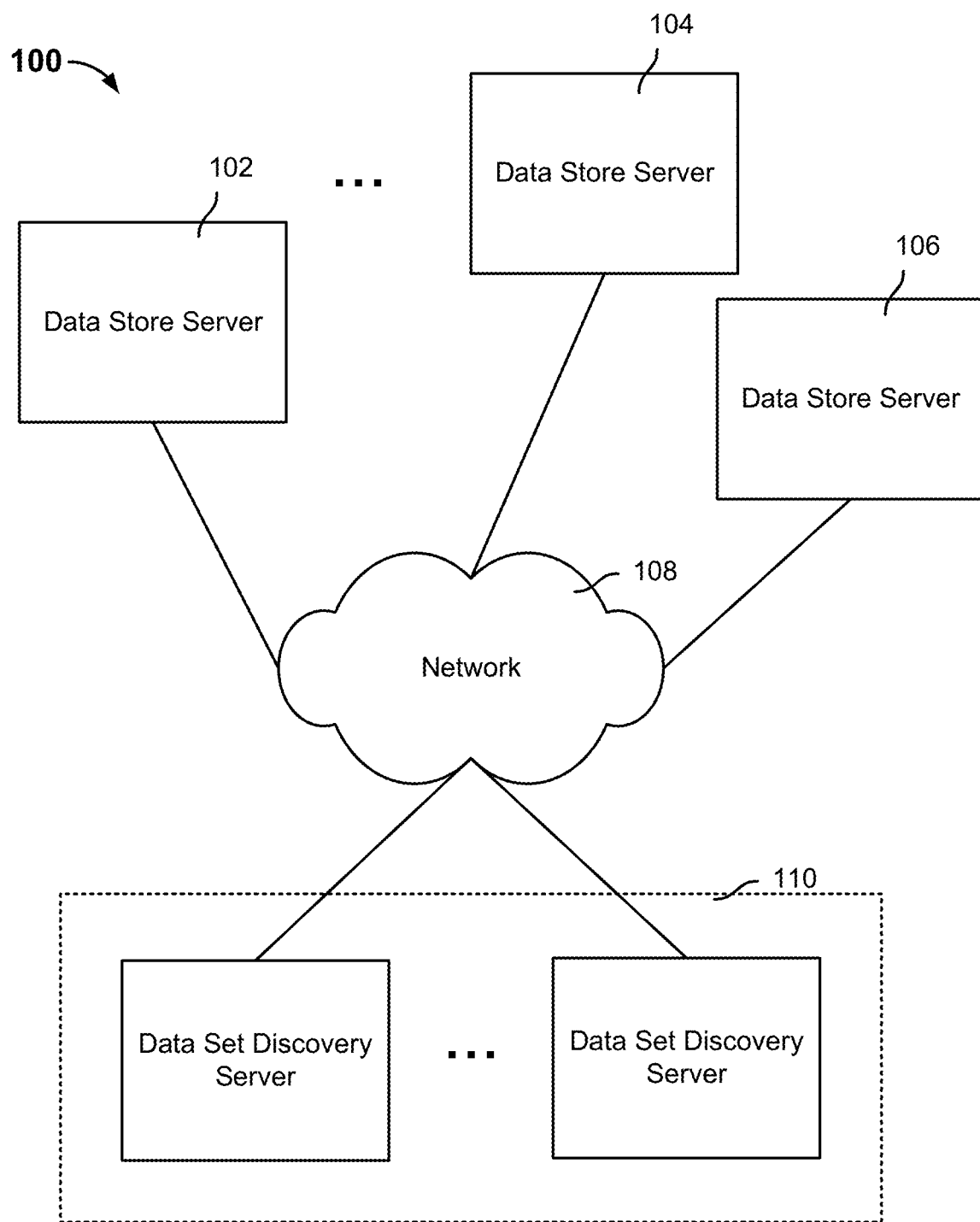
FIG. 1 is a diagram showing an embodiment of a system for the discovery of data sets.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In an example scenario, over time, a data store server can store a vast number of files across one or more hierarchies of data in a data store for a particular customer (e.g., an organization such as an enterprise). In the event that the customer wishes to have a holistic overview of the general structures of data that they have stored at the data store, conventionally, the customer would need to evaluate the metadata elements of each individual file from each data hierarchy that is stored at the data store. However, evaluating the metadata elements of each individual file, especially when there could be millions if not billions of files at a data store, could be an intractable task and one that is very inefficient. It would be desirable to efficiently identify files that belong to the same data set (e.g., files with a common set of metadata elements) across nodes of the same hierarchy of data or even across multiple hierarchies of data.

Embodiments of discovery of data sets are described herein. First file metadata elements are identified for a first file associated with a node in a hierarchy of data. In various embodiments, the hierarchy of data is located in a data storage. Examples of a data storage include a cloud data store or a data lake. In various embodiments, the files stored within the hierarchy of data comprise semi-structured and structured data. In various embodiments, a hierarchy of data comprises a tree-shaped organization of nodes and where files can be stored at leaf-nodes and also non-leaf nodes of the tree. In some embodiments, a metadata element of a file comprises a field for which a field value is stored in the file. Second file metadata elements are identified for a second file associated with the node. Common file metadata elements among the first file metadata elements and the second file metadata elements that represent a data set comprising at least the first file and the second file are determined. In some embodiments, a hash is determined using the file metadata elements that are determined to be common to the first file and the second file of the node and this hash is used to associate files related to a distinct data set across one or more nodes of the hierarchy of data.

FIG. 1 is a diagram showing an embodiment of a system for the discovery of data sets. System 100 includes data store servers 102, data store server 104, data store server 106, network 108, and multiple instances of data set discovery server 110. Network 108 comprises data and/or telecommunications networks. Data store servers 102, data store server 104, data store server 106, and more than one instance of data set discovery server 110 may communicate to each other over network 108. While only two instances of data set discovery server 110 are shown in FIG. 1, in practice, more than two instances of data set discovery server 110 can be operating in parallel to process the great volume of files associated with each data store in accordance with embodiments described herein. "Data set discovery server 110" as used herein could encompass one or more instances of the server and its functionalities.

Each of data store servers 102, 104, and 106 is configured to store data for various customers in data stores. Examples of a data store include a data lake, a database (e.g., a relational database), a key-value storage, or a data warehouse. In various embodiments, each of data store servers 102, 104, and 106 is configured to store structured or semi-structured data. Examples of structured or semi-structured data include Parquet files, JSON files, CSV files, and AVRO files. Generally, a file that stores structured or semi-structured data includes metadata elements such as fields, attributes, and columns and also the underlying data (e.g., a field value, an attribute value, a column value) for each such metadata data element. In some instances, besides fields, attributes, and columns, file metadata elements may also include entitled entities, governing policies, and past file accesses information. In various embodiments, each of data store servers 102, 104, and 106 organizes data into hierarchies. A hierarchy of data may include a tree-shaped organization of data and where files may exist at the leaf nodes (e.g., nodes with no children nodes) and optionally, at non-leaf nodes (e.g., nodes with children node(s)). Examples of hierarchies include tables and directories. In the directory example, each node in the hierarchy/tree is a folder and a folder that is descended from another folder can sometimes be referred to as a "subfolder" of the parent folder. In some embodiments, each of data store servers 102, 104, and 106 can associate hierarchies of data with the respective owner of the data or the customer that had requested to store the data.

Data set discovery server 110 is configured to scan through a subset of nodes of each hierarchy of data (e.g., associated with a particular requestor) in a data store to discover data sets. In some embodiments, in response to a request from a requestor that is a customer of a data store managed by a data store server (e.g., such as one of data store servers 102, 104, and 106), data set discovery server 110 is configured to connect with the corresponding data store server to scan through an identified data store to determine data sets thereof. In various embodiments, a "data set" is a set of files that share a common set of file metadata elements. For example, a data set can represent a logical set of data pertaining to a particular category (e.g., sales history, stock price). In various embodiments, while files in the same data set may include a common set of file metadata elements, each file in the data set may also include additional file metadata elements that are not common to all other files in the data set. In some embodiments, file metadata elements that are not common to files in a data set are sometimes referred to as being "optional."

To scan through a particular data store associated with a data set server, in various embodiments, data set discovery server 110 is configured to use a crawler that is configured to crawl files of the type (e.g., Parquet, CSV, JSON, AVRO) of files that are stored in that data store. In some embodiments, a data store includes files that are organized across one or more hierarchies (e.g., trees or directories) of data. The appropriate crawler is then configured to convert the scanned files at the data store into a format that data set discovery server 110 is configured to recognize and also scan through to discover data sets.

In various embodiments, data set discovery server 110 is configured to use parallel computer program processes (which are sometimes referred to as "workers") to concurrently traverse and scan through files stored at one or more nodes across one or more hierarchies of data in a given data store to discover data sets. In some embodiments, data set discovery server 110 is configured to maintain a central work queue of items as the workers traverse and scan through nodes of the hierarchies. For example, a worker obtains a work item from the central work queue and the work item specifies a node of a hierarchy of data that the worker is to scan. If the worker discovers that the specified node has child nodes (e.g., at the next level down in the hierarchy), then the worker will proceed to add new work items to the central work queue that specify those child nodes as needing to be scanned.

To search through files at a particular node (e.g., a leaf node in a hierarchy/tree of data) (e.g., that has been specified in an obtained work item), in various embodiments, data set discovery server 110 is configured to determine the file metadata elements that are included in each file that is stored at that node. After or while the file metadata elements are being determined for all the files at the node, data set discovery server 110 is configured to determine at least a portion of files at the node that include a common set of file metadata elements. In some embodiments, a minimum criterion with respect to common file metadata elements that files need to share to be included in the same data set can be configured and tuned. For example, the minimum criterion with respect to common file metadata elements are that files belonging to the same data set must share at least 40% (or another configurable value/portion/percentage) of their file metadata elements. This common set of file metadata elements associated with at least a portion of files that are stored at the node can be used to determine a unique identifier that represents a corresponding data set that comprises files at any node within any hierarchy of data at the data store that share this common set of file metadata elements. In some embodiments, a data set identifier is deterministically generated so that data set identifiers that are generated based on the same common set of file metadata elements are always the same. For example, the common set of file metadata elements are sorted alphabetically, concatenated, and then input into a hash function that outputs a corresponding hash to be associated with the data set. For example, if a file metadata element were a field, then the subset of fields (e.g., field names) (not the field values) that are common to at least a subset of files stored at a node can be used to (deterministically) determine a corresponding hash to uniquely represent a data set that includes those files of that node. Once a data set identifier (e.g., a hash) is determined for at least a portion of files at a node in a hierarchy at a data store, data set discovery server 110 is configured to update a central node mapping (e.g., key-value) storage that stores mappings between paths or nodes and assigned corresponding data set identifiers. Where a node is determined to have two or more different data sets (e.g., where each data set includes a different set of common file metadata elements), the central node mapping storage indicates that node as being associated with the data set identifiers associated with those two or more different data sets. Furthermore, data set discovery server 110 is configured to update a central identifier table that stores mappings between data set identifiers (e.g., hashes) and the common file metadata elements as well as the non-common file metadata elements associated with each data set hash.

As more nodes within hierarchies of data are scanned by data set discovery server 110 in a data store and mapped to corresponding data set identifiers (e.g., hashes) in the central (e.g., key-value) storage, data set discovery server 110 is configured to determine whether to skip scanning through the file metadata elements of a subsequent, given node in a hierarchy by applying heuristic scanning criteria. The heuristic scanning criteria take into account the data set identifiers that have already been determined for scanned nodes and determine whether to assign those data set identifiers to a node that has not yet been scanned. In various embodiments, a "sibling node" to a given node is a node that is on the same hierarchical level as the given node under the same parent node. For example, before scanning through the files of a given node to determine a common set of file metadata elements, data set discovery server 110 is configured to first determine whether sibling nodes to that given node meet heuristic scanning criteria for allowing data set discovery server 110 to skip the scan of files of the given node and assign the data set identifier(s) (e.g., hashes) that are common to the sibling node to the given node. In a specific example of such heuristic scanning criteria, if over 75% of the sibling nodes relative to Node L1 have already been scanned and/or have been determined to map to data set identifier h1, then the files of Node L1 do not need to be scanned for a common set of file metadata elements and instead, it is assumed that the files of Node L1 also include the common file metadata elements associated with data set identifier h1. In this specific example, the central node mapping (e.g., key-value) storage for storing mappings between paths/nodes and data set identifiers can then be updated to indicate that Node L1 maps to data set identifier h1 without the files of Node L1 having been scanned. The heuristic scanning criteria are generated based on the observation that files that are stored by a data store server at the sibling nodes of a hierarchy of data often share the same common set of file metadata elements. As such, the criteria allow data set discovery server 110 to speed up the search through hierarchies of data by skipping the scan of files of certain nodes and instead, assigning to those nodes the same data set identifier(s) that have been determined to map to many of the respective sibling nodes that have already been scanned or otherwise assigned that identifier. As will be described in further detail below, the heuristic scanning criteria for skipping scans and for assigning the data set identifier that is common to a predetermined number/percentage of sibling nodes to a node in question can apply whether the node in question is a leaf node or a non-leaf node in a hierarchy of data. In various embodiments, nodes in a hierarchy for which sibling nodes do not meet the heuristic scanning criteria are still scanned by data set discovery server 110 as described above. In various embodiments, the heuristic scanning criteria is tunable in response to an event or a user instruction.

In some embodiments, data set discovery server 110 is configured to assign a data set identifier (or identifiers) that is common to all sibling (leaf or non-leaf) nodes to the immediate parent (non-leaf) node of those sibling nodes in a hierarchy of data in the data store. As such, in some embodiments, after it is determined that the data set identifier that has been determined to be common to several scanned sibling nodes meets heuristic scanning criteria for being assigned to the remaining, unscanned sibling nodes, that same data set identifier can be assigned to the immediate parent node to (the parent node in the next level above) all the sibling nodes. However, where a parent, non-leaf node has child nodes that are associated with different data set identifiers, then the parent, non-leaf node can be assigned the superset of the distinct and differing data set identifiers associated with its child nodes.

Data set discovery server 110 is configured to scan through nodes of hierarchies of data in a data store until scan stop criteria are met. In a first example, the scan stop criteria provide that the scan through nodes should stop when there are no more work items in the central work queue. In a second example, the scan stop criteria provide that the scan through nodes should stop when each path/node within the hierarchies in the data store has been mapped to at least one data set identifier (e.g., hash).

After data set discovery server 110 finishes scanning a data store for the discovery of data sets, data set discovery server 110 can output information related to the discovered data sets. In some embodiments, data set discovery server 110 is configured to group together paths/nodes within the hierarchies of data in the data store associated with the same data set identifier and then present (e.g., at a user interface) those groupings in text-form and/or a graphic. Outputting portions (e.g., paths/nodes of hierarchies of data) in a data store that are related to the same data set (e.g., files with a common set of file metadata elements) can inform a viewing user where in the data store potentially related data (e.g., potentially related copies of data) is located and/or how many distinct data sets are present within the same data store. In some embodiments, data set discovery server 110 is configured to generate and output (e.g., at a user interface) a visualization that shows for each data set identifier (that has been determined in the data store), the common file metadata elements and also the optional (not common) file metadata elements associated with the files in the data set associated with that data set identifier. Furthermore, this visualization can also show when two different data set identifiers share a file metadata element. This visualization could inform the viewing user of the file metadata elements of each distinct data set and potentially highlight the presence of designated types of information (e.g., sensitive personal information). This visualization could further suggest whether one data set could have been derived from another data set (e.g., a data set that includes a super set of file metadata elements of another data set may have been derived from the other data set).

In some embodiments, the common and optional file metadata elements of data sets discovered by data set discovery server 110 can be used to determine classifications to be associated with those data sets.

Figure 2:
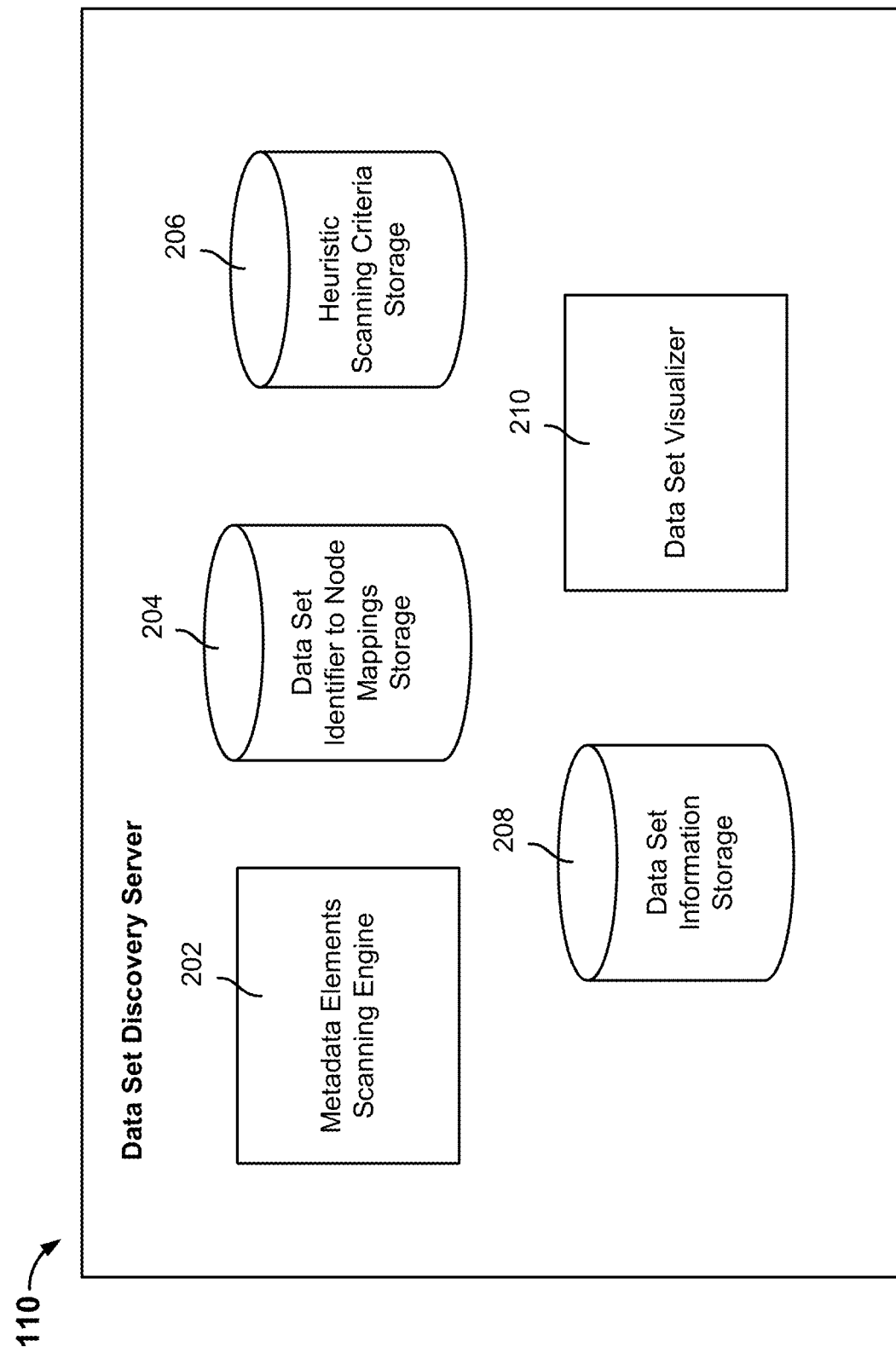
FIG. 2 is a diagram showing an example of a data set discovery server.

FIG. 2 is a diagram showing an example of a data set discovery server. In some embodiments, data set discovery server 110 of FIG. 1 can be implemented using the example shown in FIG. 2. The example data set discovery server includes metadata elements scanning engine 202, data set identifier to node mappings storage 204, heuristic scanning criteria storage 206, data set information storage 208, and data set visualizer 210. Each of metadata elements scanning engine 202, data set identifier to node mappings storage 204, heuristic scanning storage 206, data set information storage 208, and data set visualizer 210 may be implemented using hardware and/or software. Each of data set identifier to node mappings storage 204, heuristic scanning criteria storage 206, and data set information storage 208 may be implemented using any type of storage medium.

Metadata elements scanning engine 202 is configured to scan through files that are stored at a subset of nodes in one or more hierarchies of data at a data store to discover data sets among the hierarchies. In some embodiments, metadata elements scanning engine 202 is configured to traverse and scan through a given data store to discover data sets (e.g., in response to a requestor that has stored data at that data store) by executing multiple instances of a parallel computer program (e.g., "workers" or "worker processes") to perform such functionalities. In some embodiments, the parallel worker processes that are executed by metadata elements scanning engine 202 start scanning, concurrently, across one or more hierarchies of data that are stored at a data store. Given that a data store may include large volumes of files organized across one or more hierarchies of data, the use of parallel worker processes allows the scan of portions of the hierarchies to be performed more efficiently. For example, a worker process can first visit the root node of a hierarchy of data and determine that the root node has five child nodes (e.g., subfolders) and then generate work items that specify the scanning of those five child nodes at that hierarchy. The work items can be added to a central work queue (which can be stored in a centralized or distributed manner) that is accessible by all parallel worker processes. Another worker process can then obtain a work item from the central work queue and then scan the specified node in a specified hierarchy for the presence of child node(s) and also the presence of files. In this way, each instance of scanning by a worker process of a node associated with a work item can yield the discovery of additional child node(s) (if any), which will cause the addition of new respective work items to be added to the central work queue. Additionally, each instance of scanning of a node associated with the work item can also yield the discovery of files (if any) stored at that node and therefore, the determination of a common set of file metadata elements among the files at that node. As such, centrally stored data (e.g., the central node storage, the central work queue, the central identifier table) can be accessed by the parallel worker processes to synchronize their work. In various embodiments, metadata elements scanning engine 202 is configured to deterministically generate a data set identifier (e.g., a hash) based on the common set of file metadata elements that has been determined among the scanned files at that node. In some embodiments, metadata elements scanning engine 202 is also configured to store a mapping between a generated data set identifier (or identifiers) and an identifier of the relevant node in the hierarchy of data in a central node mapping storage (e.g., that is stored at data set identifier to node mapping storage 204). The mapping between a data set identifier (or identifiers) and a particular node in a hierarchy indicates that files belonging to the data set corresponding to that data set identifier (or identifiers) can be found at that node.

Given that there is potentially a large number of files (e.g., on the order of millions) stored across the nodes of hierarchies in a data store, it would be time consuming to have the worker processes executed by metadata elements scanning engine 202 visit each and every node in the data store. As such, in various embodiments, metadata elements scanning engine 202 is configured to leverage the data set identifiers that have been determined for nodes for which files at those nodes have already been scanned (e.g., in the central node mapping table that includes data set identifier to node identifier mappings) to potentially omit/skip the scanning of files located at their sibling nodes. As mentioned above, sibling nodes are nodes that are located on the same level of a hierarchy and also share a common parent node. Given that data storing techniques at a data store tend to store files with similar structures in proximate nodes of a hierarchy, in various embodiments, heuristic-based scanning criteria (e.g., which are sometimes referred to as the heuristic scanning criteria stored at heuristic scanning criteria storage 206) can include conditions for when metadata elements scanning engine 202 can omit scanning through the file metadata elements of files at a particular node (e.g., which has been specified to be scanned in a work item obtained from the central work queue). In some embodiments, the heuristic-based scanning criteria can specify a number or percentage of sibling nodes to a given node that have all been assigned (e.g., in the central node mapping table that includes data set identifier to node identifier mappings) the same data set identifier such that the files (if any) of the given node would no longer need to be scanned and that node could be assigned (e.g., by a new mapping in the central mapping storage) that same data set identifier. The intuition behind such heuristics is that in the event that a large proportion of sibling nodes to a particular node have files that share a common set of file metadata elements (and therefore, the same deterministically generated data set identifier), it is very likely that the files of the particular node also share that same set of file metadata elements and that therefore, the particular node should be assigned the same data set identifier. In some embodiments, before each worker process scans the files (if any) of a node that is specified in an obtained work item, the worker process can use the heuristic scanning criteria to determine whether enough sibling nodes to that specified node already share the same data set identifier. If the number/proportion/percentage of sibling nodes does meet the heuristic scanning criteria, the worker process omits/skips scanning through the file metadata elements of the files (if any) associated with that node and directly stores a new mapping in the central node mapping storage that associates the specified node with the common data set identifier of its sibling nodes. As such, the parallel scanning of nodes and the use of heuristic scanning criteria by the worker processes to omit scanning certain nodes can advantageously improve the efficiency of scanning through data stored in an entire data store.

In some embodiments, metadata elements scanning engine 202 can stop scanning through nodes of hierarchies of data in a data store when a set of stop criteria is met. For example, a stop criterion is that the central work queue is empty (e.g., includes no more work items). In another example, a stop criterion is if all nodes within any hierarchy of the data store have already been associated with a data set identifier in the central node mapping storage (e.g., that is stored at data set identifier to node mappings storage 204).

Data set identifier to node mappings storage 204 is configured to store central node mapping tables corresponding to respective data stores. In some embodiments, each central node mapping table includes mappings between identifiers of nodes within hierarchies (e.g., a node can be uniquely identified by the path starting from the root node of the hierarchy) and their data set identifier(s). In a first example, the data set identifier(s) that map to a particular node could have been determined by metadata elements scanning engine 202 having scanned the file metadata elements of files at the node and then deterministically generating a data set identifier based on each subset of file metadata elements that are common to the files at that node. In a second example, the data set identifier(s) that map to a particular node could have been determined by metadata elements scanning engine 202 having assigned those data set identifier(s) to that node on the basis that enough sibling nodes to that node commonly share those data set identifier(s). In a third example, the data set identifier(s) that map to a particular node could have been determined by metadata elements scanning engine 202 having assigned to that node a superset of distinct differing data set identifier(s) that have been assigned to child nodes to that node.

Heuristic scanning criteria storage 206 is configured to store sets of (e.g., tunable) heuristic scanning criteria to be used by metadata elements scanning engine 202 during its scan of nodes (and their files, if any) across hierarchies in a data store. For example, a set of heuristic scanning criteria can indicate if at least a threshold number (e.g., 100) or a threshold percentage (e.g., 70%) of sibling nodes relative to a given node are associated with the same data set identifier, then the files of the given node do not need to be scanned for common file metadata elements and that the given node should also be assigned that data set identifier. In some embodiments, each set of heuristic scanning criteria can be tuned (e.g., to adjust the threshold number or percentage of sibling nodes that is in a condition). In some embodiments, different sets of heuristic scanning criteria can be stored at storage 206 for nodes that are leaf nodes in a hierarchy and for nodes that are non-leaf nodes in a hierarchy. A set of heuristic scanning criteria can be tunable, for example, to increase the number or percentage of sibling nodes relative to a given node that must share a common data set identifier (or identifiers) in order for the given node to inherit the same data set identifier(s). Increasing the number or percentage of sibling nodes relative to a given node that must share a common data set identifier (or identifiers) could increase the accuracy that the given node is likely to have files that share the same common file metadata elements but would increase the number of nodes that are ultimately scanned and therefore increase computational cost of discovering data sets. Decreasing the number or percentage of sibling nodes relative to a given node that must share a common data set identifier (or identifiers) could decrease the accuracy that the given node is likely to have files that share the same common file metadata elements but would decrease the number of nodes that are ultimately scanned and therefore decrease the computational cost of discovering data sets.

Data set information storage 208 is configured to store information that is determined for each distinct data set that is identified in a data store. For example, the following one or more pieces can be information that can be stored for each data set that is determined within a data store: the data set identifier (e.g., hash), the common set of file metadata elements (e.g., fields) that are included in files of the data set, optional (not common) file metadata elements that are included in files of the data set, and paths/nodes within hierarchies of the data storage at which files belonging to the data set are stored.

Data set visualizer 210 is configured to output representations of data sets that have been identified in a data store. In various embodiments, data set visualizer 210 is configured to generate a presentation based on information associated with data sets that is stored at data set information storage 208. In one example, data set visualizer 210 can generate a presentation with a visualization of the hierarchies of data in the data store and indicate at which portions (e.g., nodes/paths) various data sets are identified. In another example, data set visualizer 210 can present each data set with its corresponding common file metadata elements and optional file metadata elements. This same presentation can also show the connections between different data sets that share at least some of the same file metadata elements. Data set visualizer 210 is configured to send such presentations to be presented as a user interface at a device.

Figure 3:
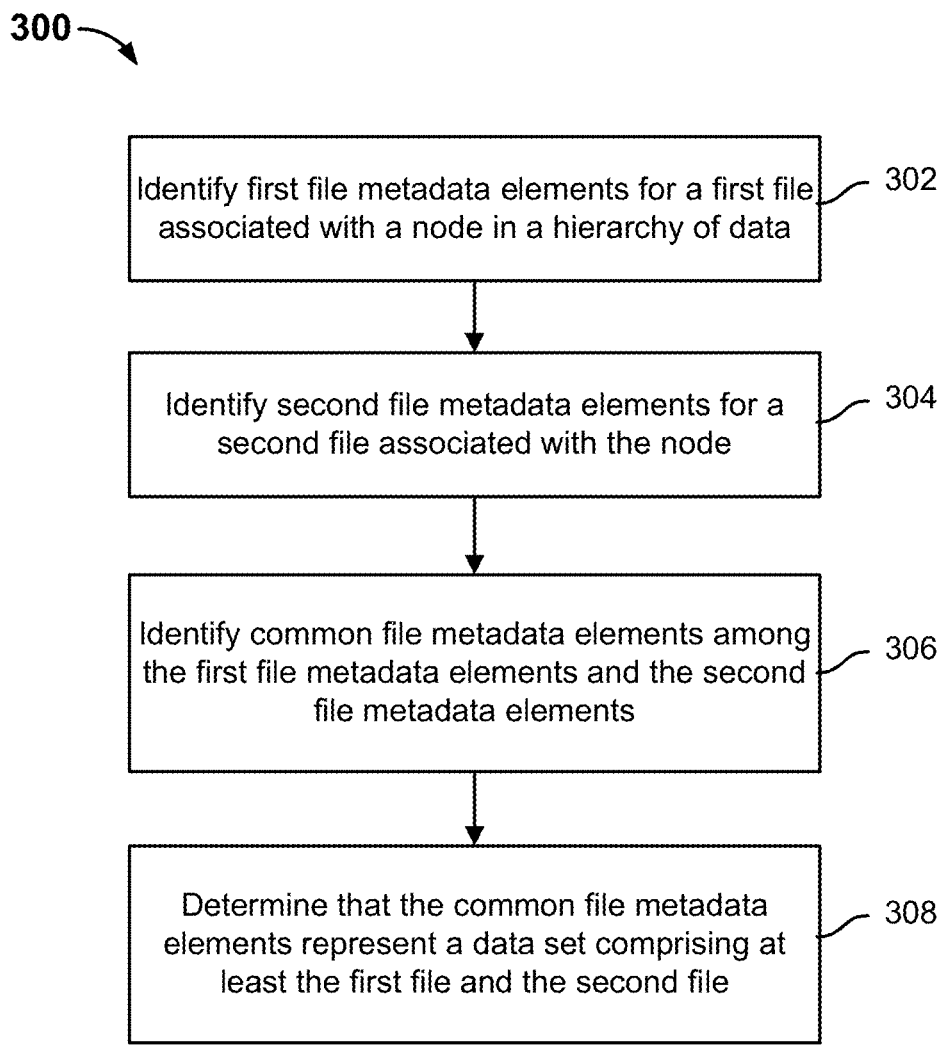
FIG. 3 is a flow diagram showing an embodiment of a process for data set discovery.

FIG. 3 is a flow diagram showing an embodiment of a process for data set discovery. In some embodiments, process 300 may be implemented on data set discovery server 110 of FIG. 1.

At 302, first file metadata elements are identified for a first file associated with a node in a hierarchy of data. In various embodiments, the hierarchy comprises structured or semi-structured files at a data store. Examples of file metadata elements comprise the fields, attributes, or columns. For each file of a node in the hierarchy that is being scanned, each file metadata element (e.g., field name, attribute name, or column name) that is included in the file is determined.

At 304, second file metadata elements are identified for a second file associated with the node.

At 306, common file metadata elements are identified among the first file metadata elements and the second file metadata elements. The fields, attributes, or columns that are shared by files (and are therefore common to both the first file and the second file) are determined as "common file metadata elements" for the two files (and any other files at the data store that share the same file metadata elements).

At 308, the common file metadata elements are determined to represent a data set comprising at least the first file and the second file. The set of file metadata elements that are common to the first and second files uniquely identify a data set, within the data store, that includes the first and second files. In various embodiments, a unique identifier corresponding to this data set is determined using the common file metadata elements. For example, the identifier comprises a hash that is deterministically generated by sorting the common file metadata elements in alphabetical order, concatenating the sorted common file metadata elements, and then hashing that concatenation.

Figure 4:
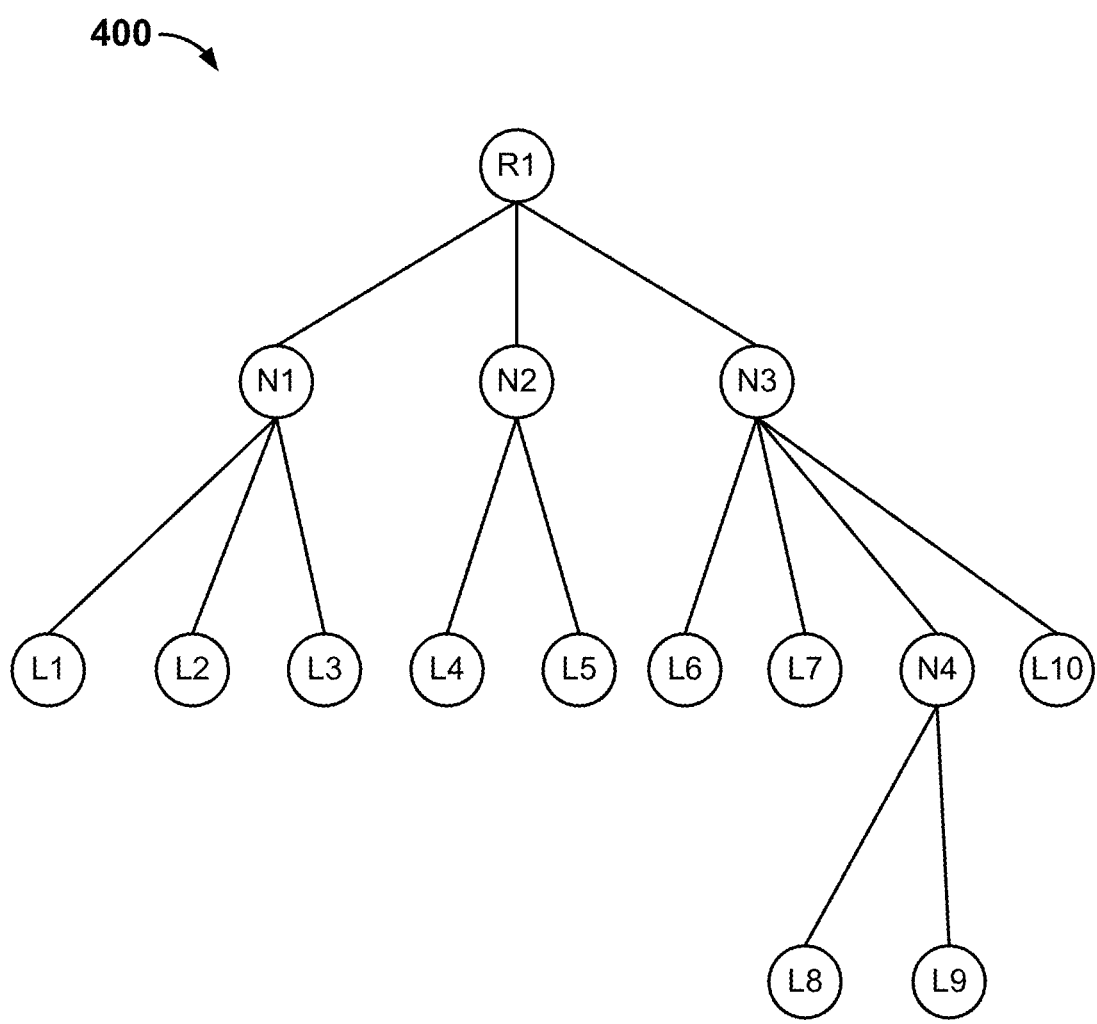
FIG. 4 is a flow diagram showing an example hierarchy of data in a data store.

FIG. 4 is a flow diagram showing an example hierarchy of data in a data store. As shown in FIG. 4, hierarchy 400 comprises root node, R1, and then three levels down of nodes. Leaf nodes, which have no child nodes of their own, are denoted with an "L." The leaf nodes in hierarchy 400 include L1, L2, L3, L4, L5, L6, L7, L8, L9, and L10. Non-leaf nodes, which have at least one child node, are denoted with an "N." The non-leaf nodes in hierarchy 400 include N1, N2, N3, and N4. By the nature of how data stores typically organize files in a hierarchy, files are usually stored at leaf nodes rather than non-leaf nodes in a hierarchy, although some files may still be stored at non-leaf nodes.

A data store in which data set discovery is to be performed (e.g., using a process such as process 300 of FIG. 3) may include one or more hierarchies of data such as hierarchy 400. As described in various embodiments, data set discovery of a data store can involve workers (e.g., computer processes) working in parallel to traverse and scan through files of the nodes of the hierarchies. While scanning through files of a leaf node, for example, worker(s) will identify the file metadata elements that are common to the files of that leaf node and then identify the files of that leaf node as belonging to a particular data set that is uniquely identified by an identifier (e.g., hash) that has been deterministically generated based on the common file metadata elements. Because a data set is uniquely associated with an identifier, after all the nodes in all of the hierarchies of data of the data store are scanned, nodes with files belonging to the same data set that are located across different levels and/or different hierarchies will be assigned/associated with the same identifier, as will be described in further detail below.

Figure 5:
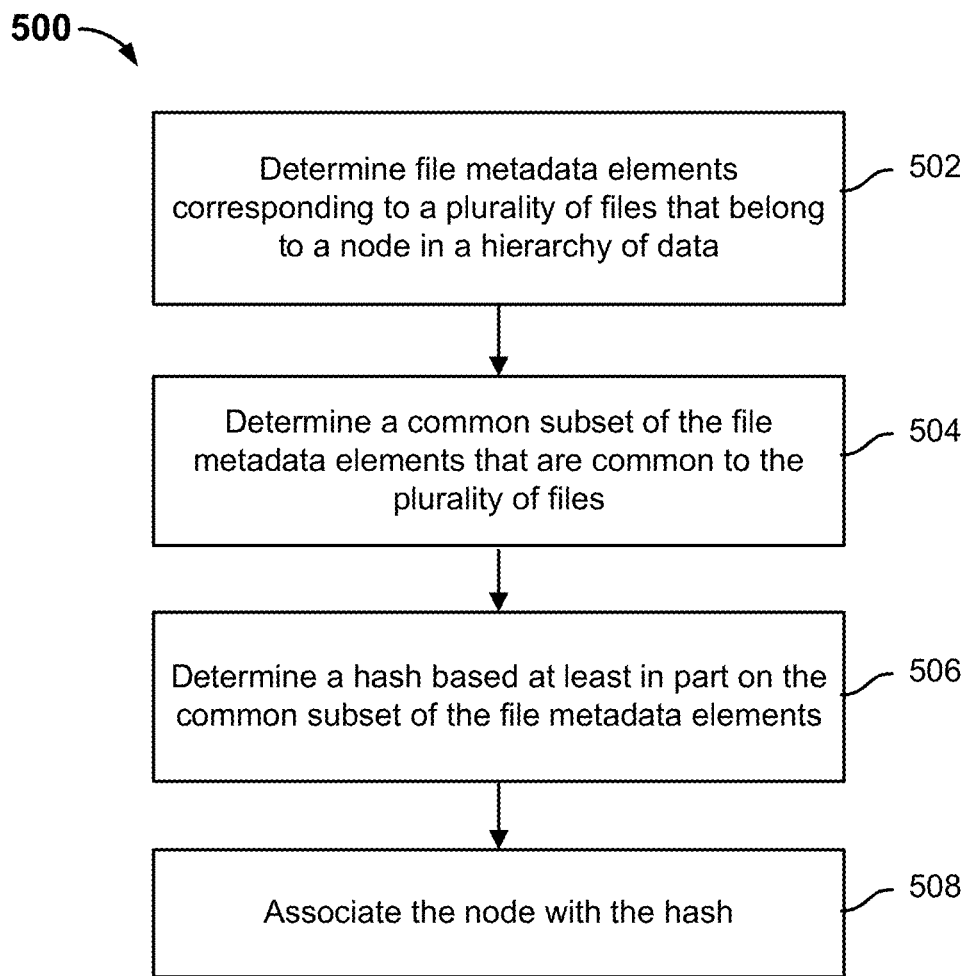
FIG. 5 is a flow diagram showing an example process for scanning files at a node.

FIG. 5 is a flow diagram showing an example process for scanning files at a node. In some embodiments, process 500 may be implemented on data set discovery server 110 of FIG. 1. In some embodiments, hierarchy 400 of FIG. 4 may be implemented, at least in part, using process 500.

Process 500 is an example process for how files at a single node in a hierarchy of data can be scanned and then used to assign a data set identifier (e.g., a hash) to that node.

At 502, file metadata elements corresponding to a plurality of files that belong to a node in a hierarchy of data are determined. In some embodiments, to determine the file metadata elements of a particular file at a node, some (e.g., less than all) of the underlying data of the file is sampled and this sampling is used to determine the file metadata elements of that file. Sampling of underlying data to determine file metadata elements will allow the scanning process to avoid reading large files fully. In some embodiments, machine learning can be applied to the data that was extracted/sampled from each file at the node to determine the file metadata elements among the extracted/sampled data. For example, the machine learning model can be trained on data for which relevant portions are annotated as file metadata elements.

At 504, a common subset of the file metadata elements that are common to the plurality of files is determined.

At 506, a hash is determined based at least in part on the common subset of the file metadata elements. In some embodiments, a hash that is deterministically generated from the subset of the file metadata elements that are common to the files at the node is used to uniquely represent the data set at the node that shared the common subset of the file metadata elements.

At 508, the node is associated with the hash. In some embodiments, a central node mapping table (e.g., in a key-value storage) that stores associations between paths to nodes and hashes (data set identifiers) associated with the nodes is updated with the hash that has been assigned to the node. In some embodiments, another table that stores the common file metadata elements as well as the optional file metadata elements (e.g., file metadata elements that belong to some but not all files in that data) that belong to a particular hash/data set is also updated.

Where a single common set of file metadata elements cannot be determined for all the files at the node, the files can be divided into two or more groups and where each group shares its own respective common set of file metadata elements and will therefore be associated with a different data set and different hash (data set identifier). The central node mapping table can be updated to indicate that the node is associated with each of such two or more hashes.

Figure 6:
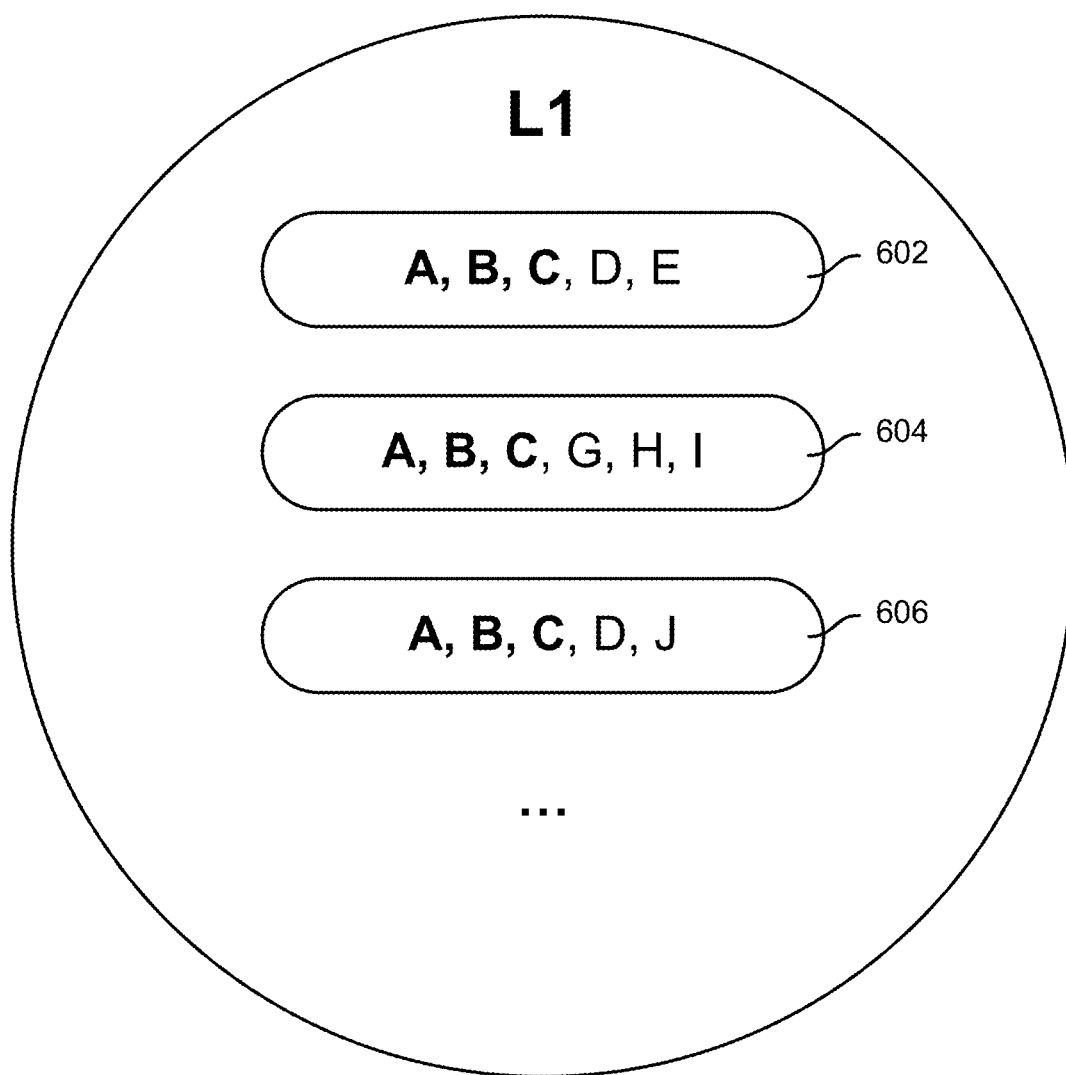
FIG. 6 is a diagram showing an example of files located at a leaf node of a hierarchy of data in a data store.

FIG. 6 is a diagram showing an example of files located at a leaf node of a hierarchy of data in a data store. In FIG. 6, representations of three files (files 602, 604, and 606) of the files that are located at Leaf Node L1 are shown. For example, each of files 602, 604, and 606 is a separate Parquet file. A Parquet file stores data in a column-oriented manner, meaning that column values for a given column are stored next to each other, rather than with their associated row/record. When one or more worker processes scan the files at Leaf Node L1 (e.g., using a process such as process 500 of FIG. 5), then the file metadata elements (e.g., column names in the case of Parquet files) of each file are determined and those that are common to files at Leaf Node L1 are determined. Referring to the example of FIG. 1, file 602 includes file metadata elements (e.g., column names): A, B, C, D, and E. File 604 includes file metadata elements (e.g., column names): A, B, C, G, H, and I. File 606 includes file metadata elements (e.g., column names): A, B, C, D, and J. Given that all files (including files 602, 604, and 606) at Leaf Node L1 share file metadata elements (e.g., column names) A, B, and C, then an identifier is generated based on those common file metadata elements A, B, and C. For example, the identifier is generated by sorting common file metadata elements A, B, and C in a deterministic (e.g., alphabetical) order, concatenating the sorted elements, and then hashing the concatenation based on a given hash function. In the example of FIG. 6, the hashing of concatenation of A, B, and C yields hash h1, which is to be used as the unique identifier of the data set comprising files located at Leaf Node L1. Furthermore, hash h1 can be associated with Leaf Node L1 and that mapping can be stored to a central node mapping table that stores relationships between paths/nodes in hierarchies to corresponding hashes (data set identifiers). In some embodiments, a central identifier table stores each hash (data set identifier) with the common file metadata elements that it encodes and also the optional file metadata elements included in the files of the data. In the example of FIG. 6, the entry in the central identifier table corresponding to hash h1 would include the common file metadata elements of A, B, and C and also the optional file metadata elements of D, E, G, H, I, and J.

Figure 7:
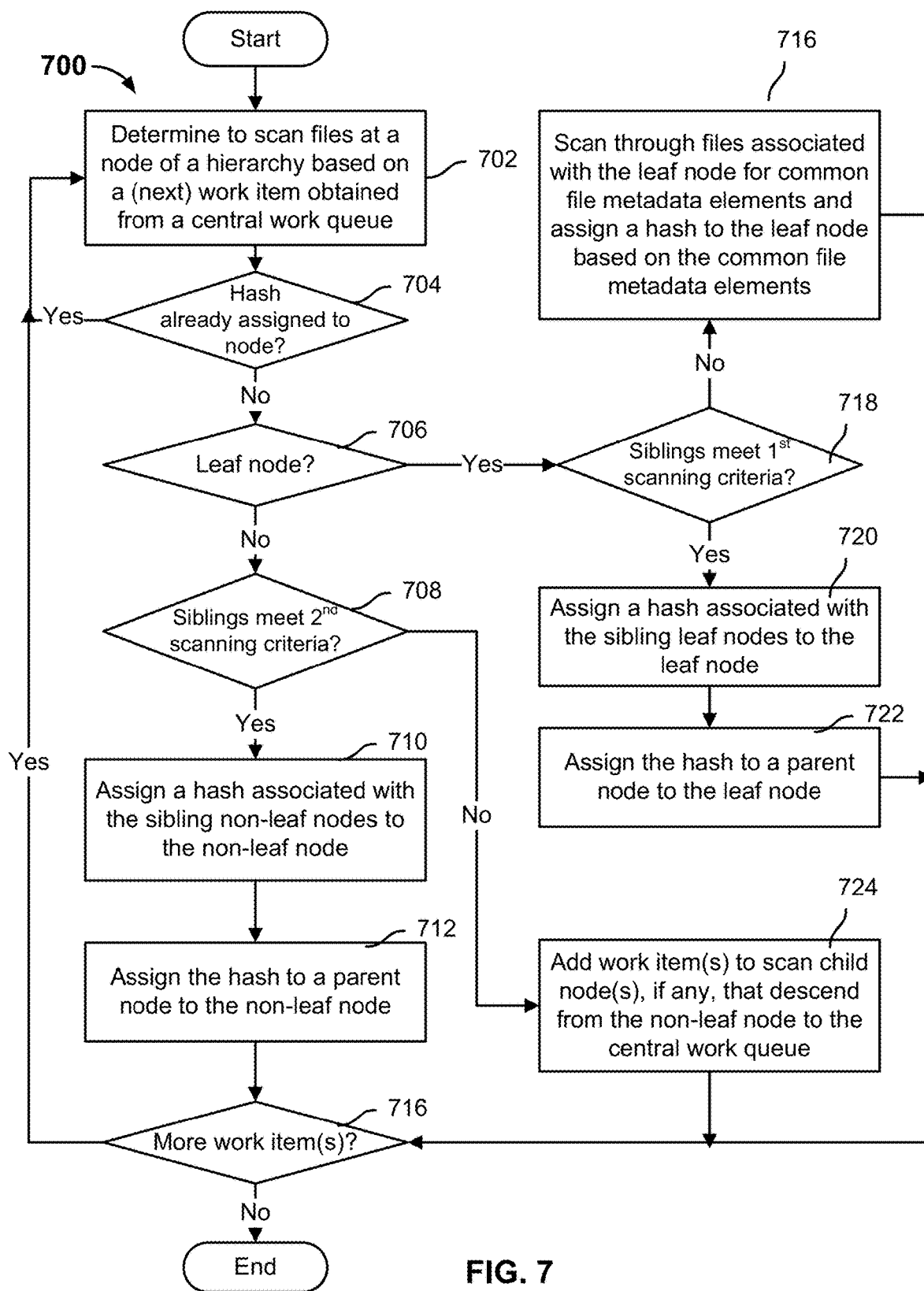
FIG. 7 is a flow diagram showing an example process for scanning through nodes across one or more hierarchies of data in a data store.

FIG. 7 is a flow diagram showing an example process for scanning through nodes across one or more hierarchies of data in a data store. In some embodiments, process 700 may be implemented on data set discovery server 110 of FIG. 1. In some embodiments, process 400 of FIG. 4 may be implemented, at least in part, using process 700.

Process 700 is an example process for how nodes across one or more hierarchies of data in a data store can be selectively scanned (e.g., the files located at that node are scanned for their file metadata elements) or assigned a hash (e.g., a data set identifier) that was previously determined for a sibling node, which will considerably speed up the discovery of data sets across the hierarchies. Process 700 also shows that new work items can be added based on newly encountered nodes and that files of nodes can be scanned in response to work items that specify that the nodes should be scanned and assigned hash(es).

At 702, a node of a hierarchy is determined to be scanned based on a (next) work item obtained from a central work queue. As mentioned above, work items are added to a central work queue (which may be stored in a central location or is implemented across more than one storage system) by worker processes as they traverse through nodes of the one or more hierarchies in a data store. A work item in the central work queue may specify, for example, identifying information associated with a node in a hierarchy for which files need to be scanned to determine one or more data sets to which the files belong. Work items are obtained and processed in parallel by worker processes. The central work queue coordinates the scanning of nodes at a data store across the parallel worker processes.

At 704, whether a hash has already been assigned to the node is determined. In the event that a hash has already been assigned to the node, control is transferred to 702. Otherwise, in the event that a hash has not yet been assigned to the node, control is transferred to 706. As mentioned above, a central node mapping table, which is a (e.g., key-value) storage that stores mappings between paths to a node in the data store and the hash(es) (a hash is an example type of a data set identifier) that have been previously determined or assigned to that node, is maintained. Before the node that is specified in the current work item is scanned, this central node mapping table can be first checked to determine whether a hash has already been stored for the node. In the event that the central node mapping table indicates that a hash has already been stored for that node (e.g., as identified by a corresponding path), then the work item is discarded, a new work item is obtained, and control is returned to 702. Otherwise, in the event that the central node mapping table does not indicate that a hash has already been stored for that node (e.g., as identified by a corresponding path), control proceeds to step 706.

At 706, whether the node is a leaf node is determined. In the event that the node is a leaf node, control is transferred to 718. Otherwise, in the event that the node is a non-leaf node, control is transferred to 708. The determination of whether the node is a leaf node or a non-leaf node in the hierarchy of which it is a part may be used to select a corresponding set of heuristic scanning criteria because, in some embodiments, different sets of heuristic scanning criteria may be configured for leaf nodes and non-leaf nodes. A set of heuristic scanning criteria (which may be sometimes referred to as "skip criteria") describes a condition that if met by the sibling nodes of the current node in question, a common hash that is associated with the sibling nodes is inherited by the current node and that files, if any, at the current node do not need to be scanned.

At 718, whether sibling nodes to the leaf node meet a first set of heuristic scanning criteria is determined. In the event that the sibling nodes to the leaf node meet the first set of heuristic scanning criteria, control is transferred to 720. Otherwise, in the event that the sibling nodes to the leaf node do not meet the first set of heuristic scanning criteria, control is transferred to 716. The set of heuristic scanning criteria corresponding to leaf nodes is obtained. For example, the set of heuristic scanning criteria corresponding to leaf nodes may specify that if more than a predetermined number (e.g., 100) or more than a predetermined percentage (e.g., 75%) of sibling nodes relative to the current node has already been assigned a common hash (as indicated in the central node mapping table), then the current node is directly assigned that same hash and the files, if any, at the current node do not need to be scanned (e.g., using a process such as process 500 of FIG. 5).

In addition to or alternative to using heuristic scanning criteria, in some embodiments, whether the leaf node should inherit the same hash associated with a sibling node can be determined by applying machine learning to the leaf node and at least some of its sibling nodes. For example, a machine learning model can be trained to differentiate between different types of text (e.g., user text transcripts versus marketing copy drafts) and different types of images (e.g., images of receipts versus images of dogs versus images of employee faces). As such, machine learning can be used to categorize the underlying data of a certain leaf node and compare that with the category that had been determined for at least some of the sibling leaf nodes. If the machine learning determined category for the leaf node in question matches that of the sibling leaf nodes, then the leaf node is to inherit the common hash associated with the sibling nodes.

At 716, files associated with the leaf node are scanned and the leaf node is assigned a hash based on the common file metadata elements. In the event that the sibling nodes relative to the current leaf node do not meet the set of heuristic scanning criteria corresponding to leaf nodes, then the files of the current node are to be scanned. The files at the current nodes are scanned to determine common file metadata elements to use to generate a data set identifier (e.g., hash) that is to be associated with a data set that includes those files (e.g., as described in process 500 of FIG. 5)

At 720, a hash associated with the sibling leaf nodes is assigned to the leaf node. In the event that the sibling nodes relative to the current node meet the set of heuristic scanning criteria corresponding to leaf nodes, then the current node is assigned the common hash (or hashes) that is shared by the sibling nodes and files of the current node are not scanned. The central node mapping table can be updated with an entry that indicates that the current node is now associated with the common hash (or hashes). The intuition of assigning the current leaf node the same hash (or hashes) that has already been determined for a sufficient amount (e.g., a number or proportion) of sibling nodes is that because enough of the sibling nodes are associated with the same hash (or hashes) and are therefore associated with the same data set, it is very likely that the current leaf node already includes files that are part of the same data set (e.g., includes the same common file metadata elements) and should be assigned the previously generated hash(s) (data set identifier(s)) for that data set.

At 722, the hash is assigned to a parent node to the leaf node. Because the current node, a leaf node, has already been assigned/inherited a hash that is shared by a sufficient number or proportion of its sibling nodes, the immediate parent node (a non-leaf node) to the leaf node and its sibling nodes can also be assigned the same hash. In some embodiments, in addition to the immediate parent node, the grandparent node (if any), great-grandparent node, and any other parent nodes, other than the root of the hierarchy, can also be assigned that same hash. Typically, a hierarchy is bounded in its number of levels (e.g., no more than 10 levels).

At 708, whether sibling nodes to the non-leaf node meet a second set of heuristic scanning criteria is determined. In the event that the sibling nodes to the non-leaf node meet a second set of heuristic scanning criteria, control is transferred to 710. Otherwise, in the event that the sibling nodes to the non-leaf node do not meet a second set of heuristic scanning criteria, control is transferred to 724. The set of heuristic scanning criteria corresponding to non-leaf nodes is obtained. For example, the set of heuristic scanning criteria corresponding to non-leaf nodes may specify that if more than a predetermined number (e.g., 50) or more than a predetermined percentage (e.g., 65%) of sibling nodes relative to the current node has already been assigned a common hash (or hashes) (as indicated in the central node mapping table), then the current node is directly assigned that same hash (or hashes) and the files, if any, at the current node do not need to be scanned (e.g., using a process such as process 500 of FIG. 5).

In addition to or alternative to using heuristic scanning criteria, in some embodiments, whether the non-leaf node should inherit the same hash associated with a sibling node can be determined by applying machine learning to the non-leaf node and at least some of its sibling nodes. For example, a machine learning model can be trained to differentiate between different types of text (e.g., user text transcripts versus marketing copy drafts) and different types of images (e.g., images of receipts versus images of dogs versus images of employee faces). As such, machine learning can be used to categorize the underlying data of a certain non-leaf node and compare that with the category that had been determined for at least some of the sibling non-leaf nodes. If the machine learning determined category for the non-leaf node in question matches that of the sibling non-leaf nodes, then the non-leaf node is to inherit the common hash associated with the sibling nodes.

At 724, work item(s) are added to scan child node(s), if any, that descend from the non-leaf node to the central work queue. In the event that the sibling nodes relative to the current non-leaf node do not meet the set of heuristic scanning criteria corresponding to non-leaf nodes, then a hash associated with a sibling node cannot be directly assigned to the current non-leaf node. While not shown in process 700, if the current non-leaf node includes any files, they can be scanned to determine a corresponding data set identifier (e.g., using a process such as process 500 of FIG. 5). Also, while not shown in process 700, if the current non-leaf node does not include any files, the current non-leaf node can be assigned the superset of unique hashes that have been assigned across its child nodes, if any. If the current non-leaf nodes have any child nodes that descend from it, a respective work item specifying to scan the files of each such child node can be added to the central work queue.

At 710, a hash associated with the sibling non-leaf nodes is assigned to the non-leaf node. In the event that the sibling nodes relative to the current node meet the set of heuristic scanning criteria corresponding to non-leaf nodes, then the current node is assigned the common hash that is shared by the sibling nodes and files of the current node are not scanned. The central node mapping table can be updated with an entry that indicates that the current node is now associated with the common hash (or hashes). The intuition of assigning the current non-leaf node the same hash that has already been determined for a sufficient amount (e.g., a number or proportion) of sibling nodes is that because enough of the sibling nodes are associated with the same hash (or hashes) and are therefore associated with the same data set, it is very likely that the current non-leaf node already includes files that are part of the same data set (e.g., includes the same common file metadata elements) and/or have child nodes with files that are part of the same data set and should be assigned the previously generated hash(es) (data set identifier(s)) for that data set.

At 712, the hash is assigned to a parent node to the non-leaf node. Because the current node, a non-leaf node, has already been assigned/inherited a hash that is shared by a sufficient number or proportion of its sibling nodes, the immediate parent node (a non-leaf node) to the non-leaf node and its sibling nodes can also be assigned the same hash. In some embodiments, in addition to the immediate parent node, the grandparent node (if any), great-grandparent node, and any other parent nodes, other than the root of the hierarchy, can also be assigned that same hash.

At 716, whether at least one more work item exists in the central work queue is determined. In the event that there is at least one more work item that exists in the central work queue, control is referred to 702. Otherwise, in the event that there are no more work items in the central work queue, process 700 ends. The example stop criteria in process 700 is if there are no more work items in the central work queue. When there are no more work items in the central work queue, each (non-root) node of each hierarchy in the data store is assumed to have already been assigned a corresponding hash (data set identifier) in the central node mapping table.

Figure 8:
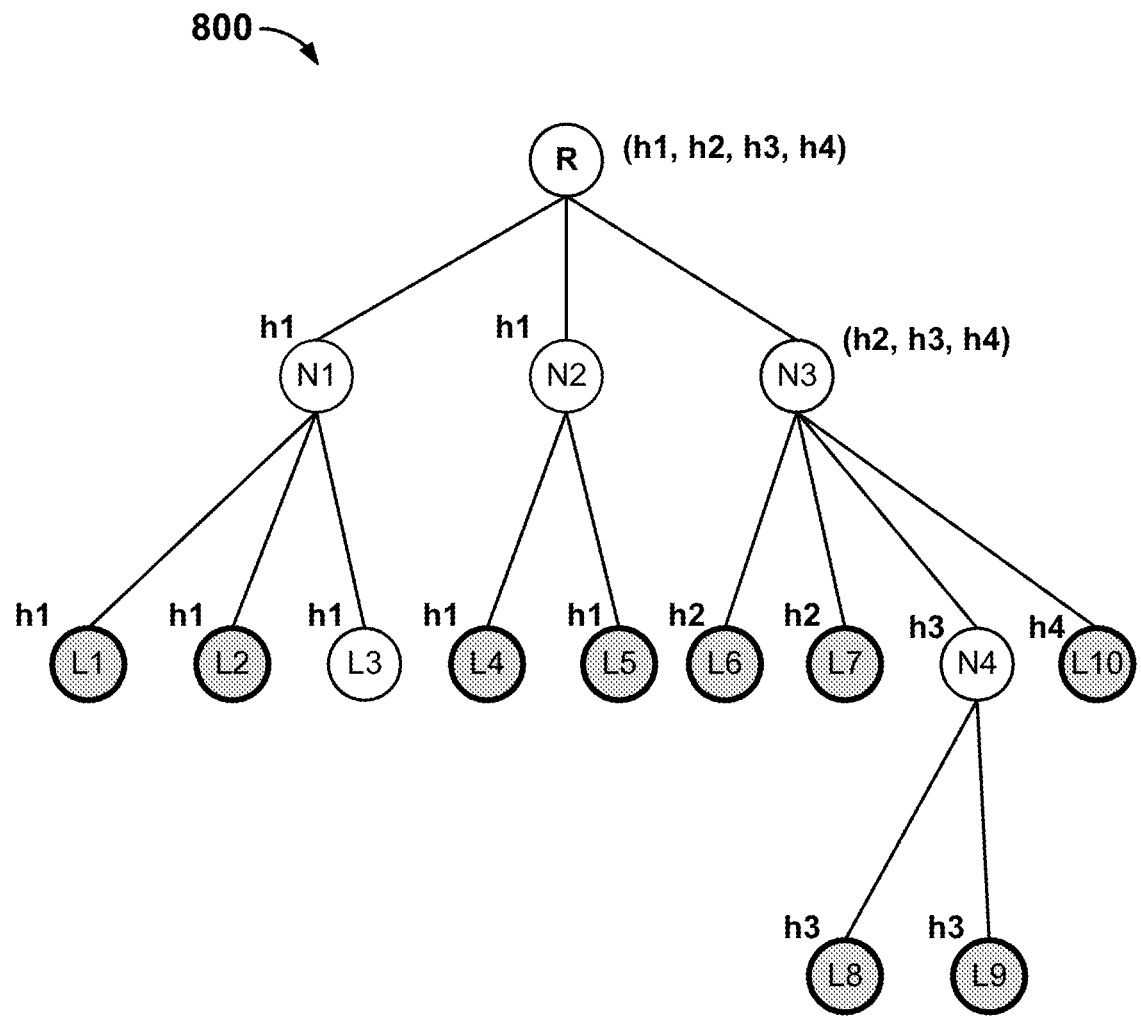
FIG. 8 is a diagram showing an example of a hierarchy of data at a data store after data set identifiers have been determined for each node in the hierarchy.

FIG. 8 is a diagram showing an example of a hierarchy of data at a data store after data set identifiers have been determined for each node in the hierarchy. In the example of FIG. 8, a data set identifier corresponding to a data set that is identified by a set of common file metadata elements is a hash that is deterministically generated from those common file metadata elements. In hierarchy 800, the root node is denoted as R, each non-leaf node is denoted with an N, and each leaf node is denoted with an L. Specifically, hierarchy 800 includes non-leaf nodes N1, N2, N3, and N4. Also, hierarchy 800 includes leaf nodes L1, L2, L3, L4, L5, L6, L7, L8, L9, and L10. A process such as process 700 of FIG. 7 was applied to hierarchy 800 and each node was processed in one of the following manners: the node's files were scanned and then the node was assigned one or more corresponding hashes based on the scan, the node's files were not (all) scanned and the node was assigned data set identifier(s) that were shared by an amount of its sibling nodes meeting a set of heuristic scanning criteria, and the node had no files and was assigned a superset of hashes that had been assigned to its child nodes.

In FIG. 8, each node that is shown with a bolded outline and is also colored in gray has had its files scanned to determine common file metadata elements and then assigned a hash that was determined based on the determined common file metadata elements. Specifically, leaf nodes L1, L2, L4, L5, L6, L7, L8, L9, and L10 are such nodes for which files were scanned and then the nodes were associated with the hash (e.g., h1, h2, h3, or h4) that was generated based on the determined common file metadata elements corresponding to each node. Each node that is shown without a bolded outline and is not colored in gray has not had its files, if any, scanned but rather has inherited/been assigned one of: a common hash that was shared by its sibling nodes, a common hash that was shared by its child nodes, or a superset of different hashes associated with its child nodes. In particular, the files of leaf node L3 were not scanned but it was assigned hash h1 because its sibling nodes leaf nodes L1 and L2 had previously been scanned and had each been assigned hash h1. In the example of FIG. 8, the set of heuristic scanning criteria corresponding to leaf nodes provides that if two or more sibling nodes relative to a given node have been assigned a common hash, then the given node should also be assigned that same node. On the basis of that example set of heuristic scanning criteria, because leaf node L3's sibling nodes leaf nodes L1 and L2 have already been scanned and assigned to the common hash of h1, then leaf node L3 is also assigned the hash of h1. The files, if any, at non-leaf node N1 were not scanned before non-leaf node N1 was assigned the hash of h1 on the basis that each of its child nodes (leaf nodes L1, L2, and L3) share hash h1. The files, if any, at non-leaf node N2 were also not scanned before non-leaf node N2 was assigned the hash of h1 on the basis that each of its child nodes (leaf nodes L4 and L5) share hash h1. The files, if any, at non-leaf node N4 were not scanned before non-leaf node N4 was assigned the hash of h3 on the basis that each of its child nodes (leaf nodes L8 and L9) share hash h3. The files, if any, at non-leaf node N3 were not scanned before non-leaf node N3 was assigned hashes of h2, h3, and h4, which comprises the superset of the distinct hashes of its immediate child nodes (leaf nodes L6, L7, N4, and L10). The files, if any, at root node R were not scanned before root node R was assigned hashes h1, h2, h3, and h4, which comprises the superset of the distinct hashes of its immediate child nodes (non-leaf nodes N1, N2, and N3).

As shown in the example of FIG. 8, the files of fewer than all of the nodes of a hierarchy of data may need to be scanned in order to assign a data set identifier (hash) to those nodes, which can increase the speed at which entire hierarchies comprising thousands, if not more, of nodes will be processed for data set discovery. Also as shown in FIG. 8, files belonging to the same data set can be easily identified across multiple nodes of one or more hierarchies by looking up the nodes that are associated with the unique hash that is associated with that data set. FIG. 9 shows one example of a central node mapping table that stores for each node in a hierarchy in a data store, the one or more hashes that are associated with data set(s) located at that node. FIG. 10 shows one example of a central identifier table that stores the common and optional file metadata elements that correspond to each hash (data set identifier).

While FIG. 8 shows only one hierarchy, a data store may include one or more such hierarchies for which nodes are scanned and then associated with corresponding data set identifiers similar to what is shown in FIG. 8.

FIG. 9 is a diagram showing an example of a central node mapping table that stores mappings between nodes and their corresponding data set identifier(s). Specifically, central node mapping table 900 includes mappings between the leaf and non-leaf nodes of hierarchy 800 of FIG. 8 and their corresponding determined data set identifier(s) (hashes). While each node in central node mapping table 900 is identified by their corresponding label as shown in FIG. 9, nodes can also be uniquely identified by their respective paths (e.g., R→N1→L1) in the data store.

FIG. 10 is a diagram showing an example of a central identifier table. Specifically, central identifier table 1000 includes mappings between the data set identifier(s) (hashes) that have been determined for nodes of hierarchy 800 of FIG. 8 and the common and optional file metadata elements (field names) that are associated with each hash. As shown in central identifier table 1000, in each row, each field name that is bolded is common to each file that belongs to the data set corresponding to that hash and each file name that is not bolded but shown in square brackets is not common to each file that belongs to the data set corresponding to that hash. For example, hash h1 includes common field names A, B, and C and includes optional field names D, E, G, H, I, J. Also, for example, hash h2 includes common field names A, D, E, and F and includes optional field names G, H, and I. For example, a central identifier table can be referred to quickly to identify the file metadata elements that are common to all files of a data set and potentially, determine a classification to associate with the data set based on one or more of the common file metadata elements. In a specific example, if one such common file metadata element included sensitive information, then the entire data set can be associated with a classification of containing sensitive information.

Figure 11:
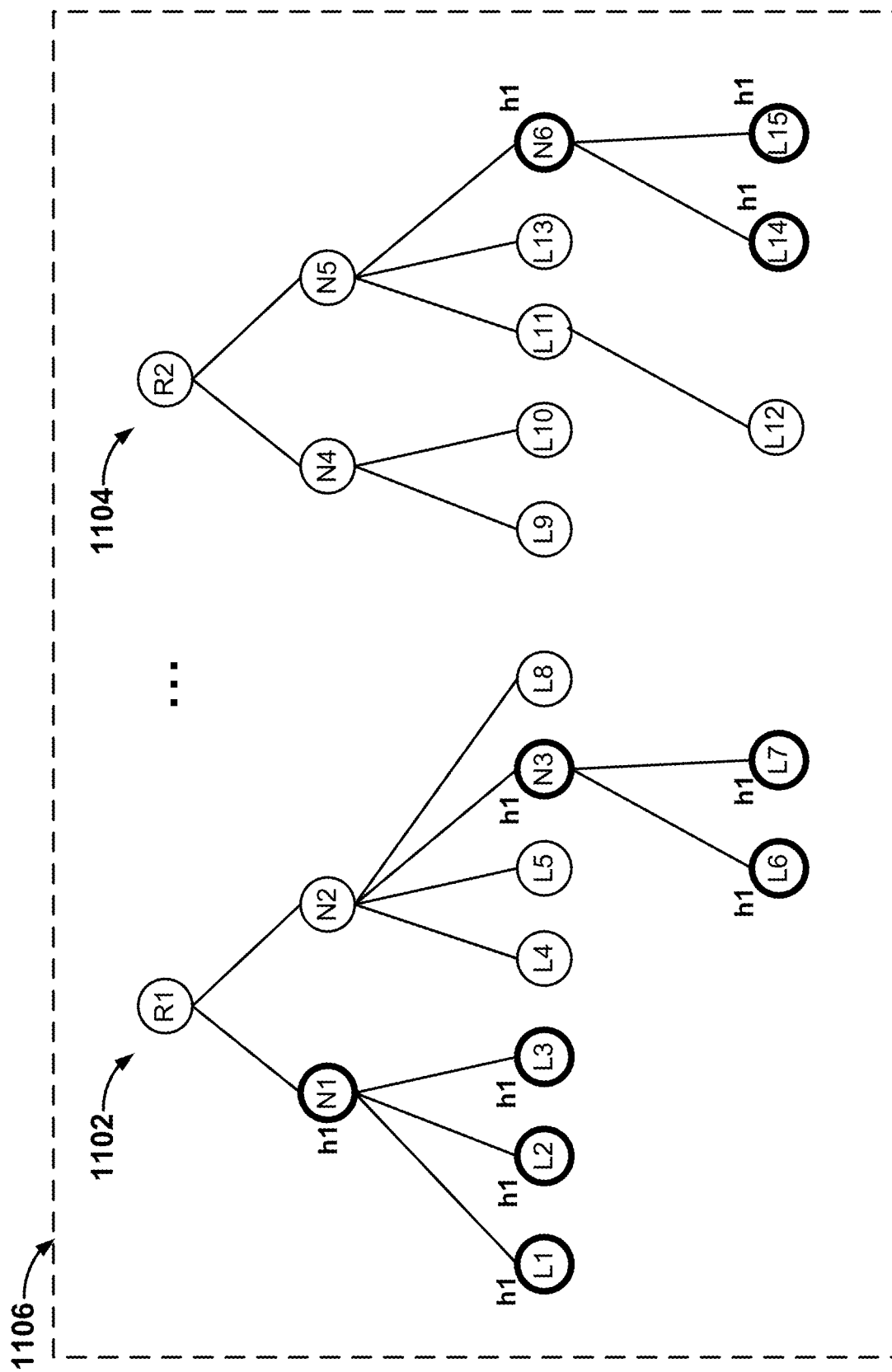
FIG. 11 is a diagram showing multiple hierarchies of data in a data store and where nodes that are associated with the same data set identifier (e.g., a hash) and therefore include files belonging to the same data set are highlighted.

FIG. 11 is a diagram showing multiple hierarchies of data in a data store and where nodes that are associated with the same data set identifier (e.g., a hash) and therefore include files belonging to the same data set are highlighted. Data store 1106 includes at least hierarchies of data 1102 and 1104. The nodes of all such hierarchies of data, including hierarchies 1102 and 1104, have already been processed using a process such as process 700 of FIG. 7. The root node of hierarchy 1102 is denoted as R1 and the root node of hierarchy 1104 is denoted as R2. Each non-leaf node of either hierarchies of data 1102 and 1104 is denoted with an N and each leaf node of either hierarchies of data 1102 and 1104 is denoted with an L. While each non-leaf (except the root nodes) and leaf node of hierarchies of data 1102 and 1104 have been assigned corresponding one or more hashes, the example of FIG. 11 shows only those (non-leaf or leaf) nodes that have been assigned the hash of h1. Specifically, nodes N1, L1, L2, L3, N3, L6, and L7 of hierarchy 1102 and nodes N6, L14, and L15 of hierarchy 1104 are associated with hash h1. Because these nodes are all associated with the same hash of h1, it can be determined that files stored at all of these nodes belong to the same data set and therefore share the same common file metadata elements. FIG. 11 shows how data set discovery as described herein allows data sets to be efficiently discovered at different locations (e.g., different nodes across the same or different hierarchies of data). By finding each location within a data store at which files belonging to the same data set are stored, operations (e.g., deleting or migrating) that are intended for an entire data set can be efficiently and accurately applied to all of that data set's files. In some embodiments, a visualization such as FIG. 11, which shows which nodes in hierarchies of a data store are associated with the same data set can be presented at a user interface.

Figure 12:
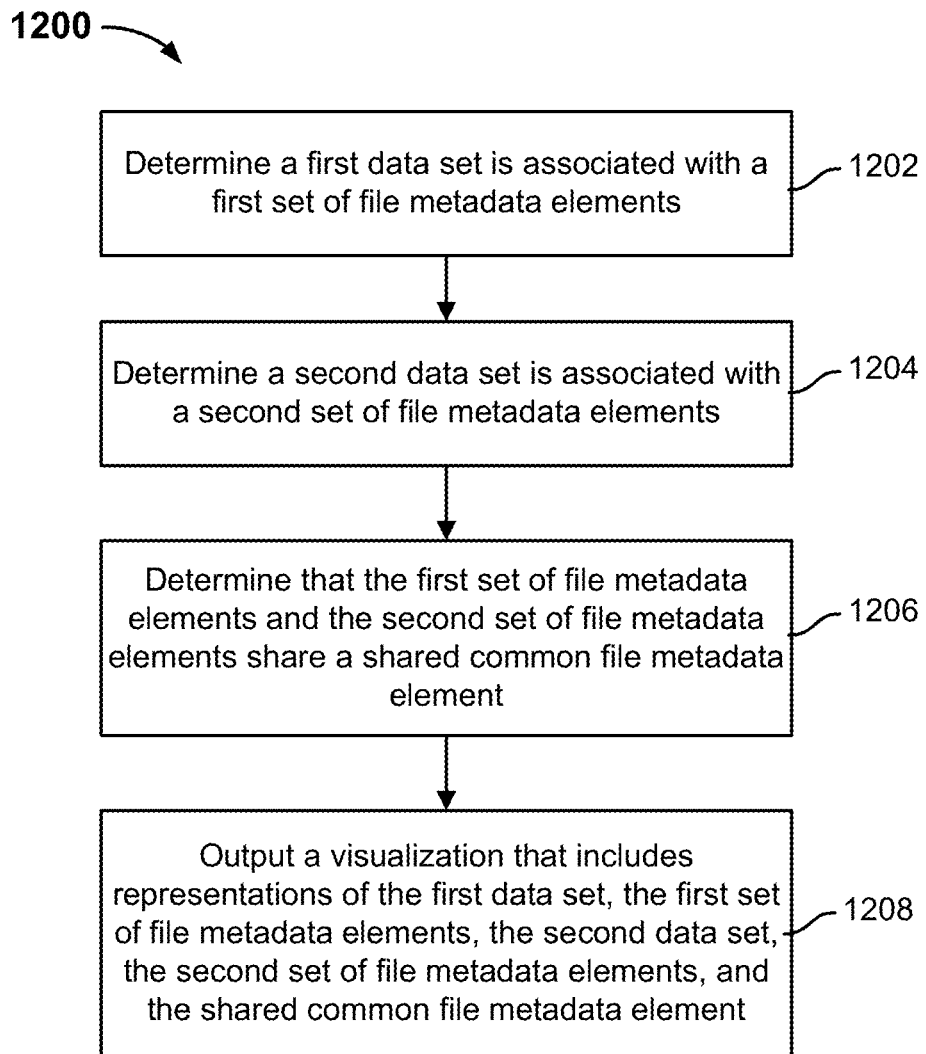
FIG. 12 is a flow diagram showing an example process for generating a visualization corresponding to file metadata elements of two data sets.

FIG. 12 is a flow diagram showing an example process for generating a visualization corresponding to file metadata elements of two data sets. In some embodiments, process 1200 may be implemented on data set discovery server 110 of FIG. 1.

Process 1200 describes an example process of generating a visualization that shows file metadata elements of two different data sets and the shared relationship between the two data sets with respect to a shared file metadata element. While process 1200 discusses generating a visualization for two data sets, the idea can be extended to three or more data sets.

At 1202, a first data set associated with a first set of file metadata elements is determined. The first set of file metadata elements comprises the common and optional file metadata elements belonging to files of the first data set.

At 1204, a second data set associated with a second set of file metadata elements is determined. The second set of file metadata elements comprises the common and optional file metadata elements belonging to files of the second data set.

At 1206, it is determined that the first set of file metadata elements and the second set of file metadata elements share a shared common file metadata element. Any common file metadata element that is common to the files of both data sets is determined as a "shared common file metadata element" between the two data sets.

At 1208, a visualization that includes representations of the first data set, the first set of file metadata elements, the second data set, the second set of file metadata elements, and the shared common file metadata element is output. For example, the visualization (e.g., that is outputted to a user interface) can show the respective common file metadata elements corresponding to each data set as well as identify the shared common file metadata element(s) that are included in the sets of common file metadata elements belonging to the two data sets.

Figure 13:
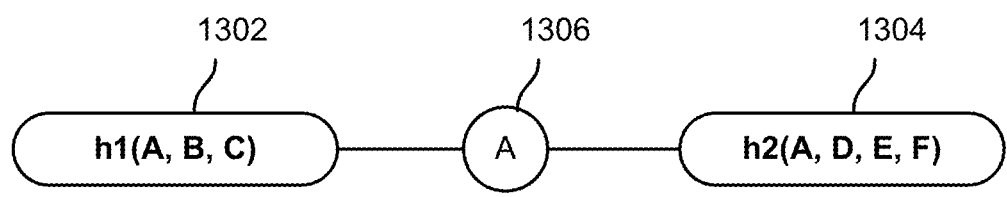
FIG. 13 is a diagram showing an example visualization of two data sets.

FIG. 13 is a diagram showing an example visualization of two data sets. Each common file metadata element that is associated with either of data sets h1 or h2 is identified within the respective one(s) of rounded rectangles 1302 and/or 1304. Specifically, FIG. 13 shows the data set that is represented by hash h1, which includes common file metadata elements A, B, and C (as described in Table 1000 of FIG. 10). The other data set that is represented by hash h2 includes common file metadata elements A, D, E, and F (as described in Table 1000 of FIG. 10). Common file metadata element A is shared between the data set associated with hash h1 and the data set associated with hash h2. As such, shared common file metadata element A is shown in circle 1306 that is connected to both rounded rectangles 1302 and 1304 that are respectively associated with the data sets associated with hashes h1 and h2. The other file metadata elements that are common to only files of the data set associated with hash h1 but not the files of the data set associated with hash h2, or vice versa, are not shown in the visualization of FIG. 13, for simplicity.

An example visualization at a user interface of the connections, if any, among the common file metadata elements of different data sets (such as shown in FIG. 13) can provide an instant picture of which common file metadata elements are included in which data sets and also whether any of the common file metadata elements may be related to more than one data set.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
identify first file metadata elements for a first file associated with a node in a hierarchy of data;
identify second file metadata elements for a second file associated with the node;
identify common file metadata elements among the first file metadata elements and the second file metadata elements;
determine that the common file metadata elements represent a data set comprising at least the first file and the second file;
generate a data set identifier based at least in part on the common file metadata elements, wherein the data set identifier comprises a hash; and
associate the node with the data set identifier; and
a memory coupled to the processor and configured to provide the processor with instructions.

2. The system of claim 1, wherein to associate the node with the data set identifier comprises to update a central node mapping table to indicate a mapping between the node and the data set identifier.

3. The system of claim 1, wherein the node comprises a first node, and wherein the processor is further configured to:
determine that sibling nodes relative to a second node in the hierarchy of data meet a set of heuristic scanning criteria; and
in response to the determination that the sibling nodes relative to the second node in the hierarchy of data meet the set of heuristic scanning criteria:
omit scanning files associated with the second node; and
associate the second node with a common data set identifier associated with the sibling nodes.

4. The system of claim 3, wherein the processor is further configured to associate a parent node relative to the second node and the sibling nodes with the common data set identifier associated with the sibling nodes.

5. The system of claim 1, wherein the node comprises a first node, and wherein the processor is further configured to:
execute a first worker to obtain a first work item to scan the first node;
execute a second worker to obtain a second work item to scan a second node, wherein the second worker is configured to scan the second node at least partially in parallel to the first worker scanning the first node;
determine that the second node includes a set of child nodes; and
add new work items corresponding to scanning the set of child nodes to a central work queue.

6. The system of claim 1, wherein prior to identifying the first file metadata elements for the first file associated with the node in the hierarchy of data, the processor is further configured to execute one or more parallel workers to obtain respective work items from a central work queue, and wherein a work item specifies to scan the node.

7. The system of claim 1, wherein the processor is further configured to update a central identifier table to indicate that the data set is associated with the common file metadata elements and optional metadata elements.

8. The system of claim 1, wherein the processor is further configured to present a visualization, at a user interface, that shows that files belonging to the data set are located at the node of the hierarchy of data.

9. The system of claim 1, wherein the data set comprises a first data set, wherein the first data set comprises a first set of file metadata elements comprising the common file metadata elements, and wherein the processor is further configured to:
determine that the first set of file metadata elements and a second set of file metadata elements associated with a second data set share a shared file metadata element; and
output a visualization that includes representations of the first data set, the first set of file metadata elements, the second data set, the second set of file metadata elements, and the shared file metadata element.

10. The system of claim 1, wherein the first file comprises structured data or semi-structured data.

11. A method, comprising:
identifying first file metadata elements for a first file associated with a node in a hierarchy of data;
identifying second file metadata elements for a second file associated with the node;
identifying common file metadata elements among the first file metadata elements and the second file metadata elements;
determining that the common file metadata elements represent a data set comprising at least the first file and the second file;
generating a data set identifier based at least in part on the common file metadata elements, wherein the data set identifier comprises a hash; and
associating the node with the data set identifier.

12. The method of claim 11, wherein associating the node with the data set identifier comprises updating a central node mapping table to indicate a mapping between the node and the data set identifier.

13. The method of claim 11, wherein the node comprises a first node, and the method further comprising:
determining that sibling nodes relative to a second node in the hierarchy of data meet a set of heuristic scanning criteria; and
in response to the determination that the sibling nodes relative to the second node in the hierarchy of data meet the set of heuristic scanning criteria:
omitting scanning files associated with the second node; and
associating the second node with a common data set identifier associated with the sibling nodes.

14. The method of claim 13, further comprising associating a parent node relative to the second node and the sibling nodes with the common data set identifier associated with the sibling nodes.

15. The method of claim 11, wherein the data set comprises a first data set, wherein the first data set comprises a first set of file metadata elements comprising the common file metadata elements, and the method further comprising:

determining that the first set of file metadata elements and a second set of file metadata elements associated with a second data set share a shared file metadata element; and outputting a visualization that includes representations of the first data set, the first set of file metadata elements, the second data set, the second set of file metadata elements, and the shared file metadata element.

16. A computer program product, the computer program product being embodied in a non-transitory computer readable storage medium and comprising computer instructions for:

identifying first file metadata elements for a first file associated with a node in a hierarchy of data;

identifying second file metadata elements for a second file associated with the node;

identifying common file metadata elements among the first file metadata elements and the second file metadata elements;

determining that the common file metadata elements represent a data set comprising at least the first file and the second file;

generating a data set identifier based at least in part on the common file metadata elements, wherein the data set identifier comprises a hash; and associating the node with the data set identifier.

17. A system, comprising:

a processor configured to:
identify first file metadata elements for a first file associated with a first node in a hierarchy of data;
identify second file metadata elements for a second file associated with the first node;
identify common file metadata elements among the first file metadata elements and the second file metadata elements;
determine that the common file metadata elements represent a data set comprising at least the first file and the second file;
determine that sibling nodes relative to a second node in the hierarchy of data meet a set of heuristic scanning criteria; and
in response to the determination that the sibling nodes relative to the second node in the hierarchy of data meet the set of heuristic scanning criteria:
omit scanning files associated with the second node; and
associate the second node with a common data set identifier associated with the sibling nodes; and
a memory coupled to the processor and configured to provide the processor with instructions.

18. A system, comprising:

a processor configured to:
identify first file metadata elements for a first file associated with a node in a hierarchy of data;
identify second file metadata elements for a second file associated with the node;
identify common file metadata elements among the first file metadata elements and the second file metadata elements;
determine that the common file metadata elements represent a data set comprising at least the first file and the second file; and
update a central identifier table to indicate that the data set is associated with the common file metadata elements and optional metadata elements; and
a memory coupled to the processor and configured to provide the processor with instructions.

19. A method, comprising:

identifying first file metadata elements for a first file associated with a node in a hierarchy of data;

identifying second file metadata elements for a second file associated with the node;

identifying common file metadata elements among the first file metadata elements and the second file metadata elements;

determining that the common file metadata elements represent a data set comprising at least the first file and the second file; and updating a central identifier table to indicate that the data set is associated with the common file metadata elements and optional metadata elements.

20. A system, comprising:

a processor configured to:
identify first file metadata elements for a first file associated with a node in a hierarchy of data;
identify second file metadata elements for a second file associated with the node;
identify common file metadata elements among the first file metadata elements and the second file metadata elements;
determine that the common file metadata elements represent a first data set comprising at least the first file and the second file, wherein the first data set comprises a first set of file metadata elements comprising the common file metadata elements;
determine that the first set of file metadata elements and a second set of file metadata elements associated with a second data set share a shared file metadata element; and
output a visualization that includes representations of the first data set, the first set of file metadata elements, the second data set, the second set of file metadata elements, and the shared file metadata element; and
a memory coupled to the processor and configured to provide the processor with instructions.

* * * * *